United States Patent
Uchida (10) Patent No.: US 11,199,459 B2
(45) Date of Patent: Dec. 14, 2021

(54) DETECTION DEVICE HAVING CONTACTING VARIABLE RESISTOR PORTION WITH CONTACT AREA VARYING CORRESPONDINGLY TO LOAD FOR IMPROVED LINEARITY OF OUTPUT VOLTAGE

(71) Applicant: ALPS ALPINE CO., LTD., Tokyo (JP)

(72) Inventor: Ryosuke Uchida, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 7 days.

(21) Appl. No.: 16/897,455

(22) Filed: Jun. 10, 2020

(65) Prior Publication Data

US 2020/0300719 A1    Sep. 24, 2020

Related U.S. Application Data

(63) Continuation of application No. PCT/JP2018/043973, filed on Nov. 29, 2018.

(30) Foreign Application Priority Data

Dec. 18, 2017    (JP) .............................. JP2017-242000

(51) Int. Cl.
    *G01L 1/22*    (2006.01)
(52) U.S. Cl.
    CPC .................................. *G01L 1/2287* (2013.01)
(58) Field of Classification Search
    None
    See application file for complete search history.

(56) References Cited

U.S. PATENT DOCUMENTS 6,275,138 B1 * 8/2001 Maeda ................. H01C 10/106
                                                              338/128
6,420,956 B1    7/2002 Furudate et al.
(Continued)

FOREIGN PATENT DOCUMENTS

JP    H05-036507    2/1993
JP    2000-353604    12/2000
(Continued)

OTHER PUBLICATIONS

International Search Report for PCT/JP2018/043973 dated Feb. 26, 2019.

*Primary Examiner* — Lisa M Caputo
*Assistant Examiner* — Nigel H Plumb
(74) *Attorney, Agent, or Firm* — IPUSA, PLLC (57)    ABSTRACT

A detection device includes a variable resistor portion formed between first and second electrodes, and an elastically deformable contact member having a contact area for making contact with the variable resistor portion. The contact area increases according to a load that is applied to the contact member in a direction toward the variable resistor portion. The variable resistor portion includes an output varying region that varies an output voltage from the second electrode according to the contact area. The output varying region is formed so that a contact distance between the variable resistor portion and an outer peripheral portion of the contact member becomes longer as the contact area becomes larger, so that the contact area varies correspondingly to the load for improved linearity of the output voltage.

18 Claims, 8 Drawing Sheets

(56) References Cited

U.S. PATENT DOCUMENTS

| 6,717,568 B1 | 4/2004 | Takatuka et al. |
| 2002/0050918 A1* | 5/2002 | Furudate ................... G01L 5/22 338/47 |
| 2002/0065134 A1* | 5/2002 | Ogata ................... H01H 9/0235 463/37 |

FOREIGN PATENT DOCUMENTS

| JP | 2000-353606 | 12/2000 |
| JP | 2001-320786 | 11/2001 |
| JP | 2002-042597 | 2/2002 |

* cited by examiner

DETECTION DEVICE HAVING CONTACTING VARIABLE RESISTOR PORTION WITH CONTACT AREA VARYING CORRESPONDINGLY TO LOAD FOR IMPROVED LINEARITY OF OUTPUT VOLTAGE

CROSS-REFERENCE TO RELATED APPLICATIONS

This application is a continuation application of International Application No. PCT/JP2018/043973 filed on Nov. 29, 2018 and designated the U.S., which is based upon and claims priority to Japanese Patent Application No. 2017-242000, filed on Dec. 18, 2017, the entire contents of which are incorporated herein by reference.

BACKGROUND OF THE INVENTION

1. Field of the Invention

The present invention relates to a detection device.

2. Description of the Related Art

Conventionally, there is a known detection device that includes first through third conductor patterns, a first resistor formed between the first and second conductor patterns, a second resistor formed between the second and third conductor patterns, and an elastically deformable contact arranged on the first resistor. In the conventional detection device, a contact area between the contact and the first resistor can be varied by pressing the contact toward the first resistor, to vary the resistance between the first and second conductor patterns. Accordingly, when a predetermined voltage is applied to the first and third conductor patterns, respectively, and a voltage of the second conductor pattern is regarded as an output, the conventional detection device may be used as a detection device that outputs a voltage according to an operation performed on the contact, that is, according to a load applied to the contact.

As an example, Japanese Laid-Open Patent Publication No. 2002-042597 describes an example of the detection device having the elastically deformable contact.

However, in the conventional detection device, the resistance between the first and second conductor patterns varies linearly with respect to the load applied to the contact. For this reason, the voltage of the second conductor pattern, that is, the output of the detection device, becomes nonlinear with respect to the applied load.

SUMMARY OF THE INVENTION

One object of the present disclosure is to improve the linearity of the output voltage of the detection device with respect to the applied load.

According to one aspect of the embodiments, a detection device includes a first electrode; a second electrode; a variable resistor portion formed between first electrode and the second electrode; and a contact member that is elastically deformable and has a contact area with the variable resistor portion, wherein the contact area increases according to a load that is applied to the contact member in a direction toward the variable resistor portion, wherein the variable resistor portion includes an output varying region that varies an output voltage from the second electrode according to the contact area, and wherein the output varying region is famed so that a contact distance between the variable resistor portion and an outer peripheral portion of the contact member becomes longer as the contact area becomes larger.

Other objects and further features of the present invention will be apparent from the following detailed description when read in conjunction with the accompanying drawings.

DESCRIPTION OF THE PREFERRED EMBODIMENTS

Embodiments of the present invention will be described in the following. In the specification and the drawings related to the embodiments, those members or parts that are substantially the same are designated by the same reference numerals, and a repeated description of substantially the same members or parts will be omitted.

An input device 100 according to one embodiment will be described, by referring to FIG. 1 through FIG. 8. The input device 100 according to this embodiment includes a detection device 1 that detects a user's operation performed on a pressing member thereof. The detection device 1 outputs a voltage according to the user's operation performed on the pressing member thereof. The voltage output from the input device 100 (detection device 1) is input to an external device (not illustrated), as a signal according to the user's operation performed on the pressing member. The input device 100 may be used as an input device of a game controller, for example.

Figure 1:
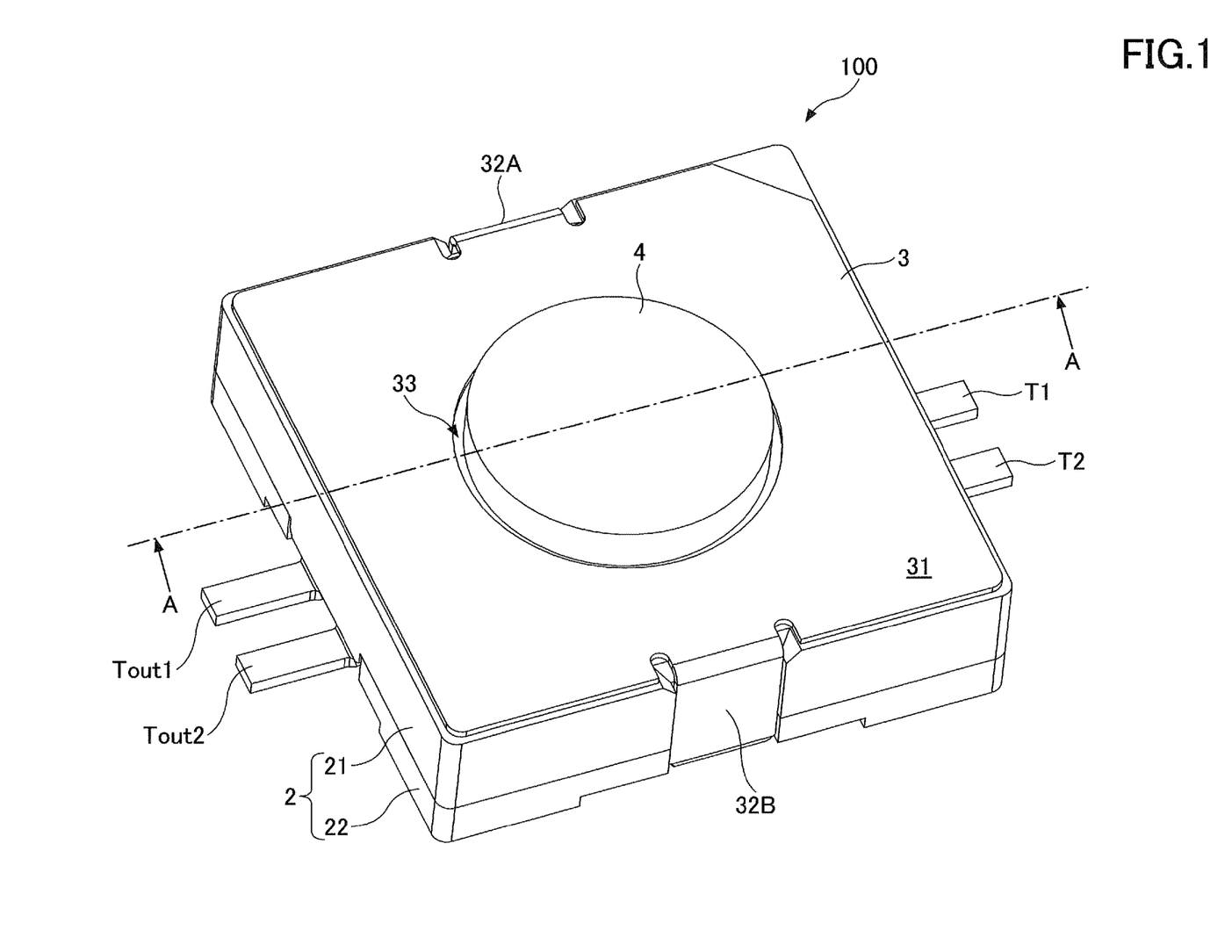
FIG. 1 is an outline perspective view illustrating an example of a detection device.
Figure 2:
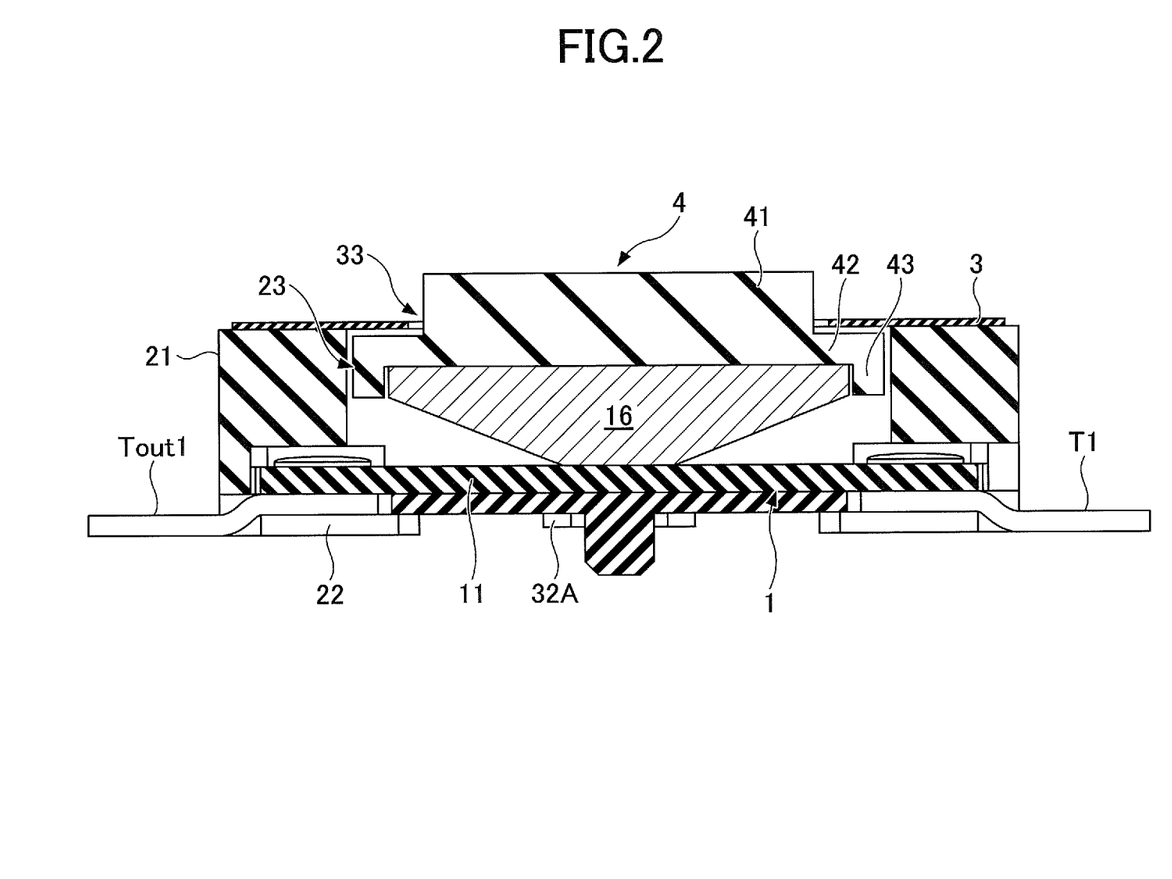
FIG. 2 is a cross sectional view of the detection device along a line A-A in FIG. 1.

First, a structure of the input device 100 will be described. FIG. 1 is an outline perspective view illustrating an example of the input device 100. FIG. 2 is a cross sectional view of the detection device 100 along a line A-A in FIG. 1. For the sake of convenience, the upper and lower sides in FIG. 1 and FIG. 2 will be described in the following as the upper and lower sides of the input device 100. The input device 100 illustrated in FIG. 1 includes the detection device 1, a housing 2, a cover 3, a pressing member 4, a first terminal T1, a second terminal T2, and output terminals Tout1 and Tout2. Details of the detection device 1 will be described later.

The housing 2 is formed by an insulating resin or the like, and has a parallelepiped (box) shape that accommodates therein the detection device 1. The housing 2 includes an upper housing portion 21, and a lower housing portion 22. The upper housing portion 21 forms the upper portion of the housing 2, and includes an opening 23 through which the pressing member 4 is inserted. The lower housing portion 22 forms the lower portion of the housing 2, and the detection device 1 is provided on the lower housing portion 22. The housing 2 is formed by integrally connecting the upper housing portion 21 and the lower housing portion 22. Of course, the shape of the housing 2 is not limited to the parallelepiped shape of the example illustrated in FIG. 1.

The cover 3 is a plate-shaped member that connects the upper housing portion 21 and the lower housing portion 22. The cover 3 includes a plate portion 31, and claw portions 32A and 32B. The plate portion 31 has an approximately rectangular shape, and is arranged on an upper surface of the housing 2. The plate portion 31 includes an opening 33 through which the pressing member 4 is inserted. The claw portions 32A and 32B have an approximately L-shaped cross section extending downward from the plate portion 31, and are arranged to oppose each other. The cover 3 sandwiches the housing 2 from the upper and lower sides, via the plate portion 31 and the claw portions 32A and 32B, to integrally connect the upper housing portion 21 and the lower housing portion 22. The housing 2 may be formed by insert molding, for example, to include the detection device 1 and the output terminals Tout1 and Tout2.

The method of integrally connecting the upper housing portion 21 and the lower housing portion 22 is not limited to the method described above. The upper housing portion 21 and the lower housing portion 22 may be integrally connected by methods such as fitting, snap-fitting, bonding, or the like, for example. According to such methods, the input device 100 does not require the cover 3.

A user's operation is performed on the pressing member 4, that is, the pressing member 4 is pressed by the user. The pressing member 4 is arranged inside the housing 2, and a portion of the pressing member 4 is exposed to the outside of the housing 2. When the pressing member 4 is pressed downward by the user, the input device 100 outputs an output voltage Vout according to a load L that is applied to the pressing member 4 in a downward direction. Hence, it is possible to detect the pressing operation of the user performed on the pressing member 4. The pressing member 4 includes a pressing portion 41, a flange portion 42, and a holding portion 43.

The pressing portion 41 is a portion that is pressed by the user, and has a cylindrical shape. The pressing portion 41 penetrates the openings 23 and 33, and is exposed from an upper surface of the input device 100. The flange portion 42 has a planar shape that is larger than that of the pressing portion 41, and is provided on a lower end of the pressing portion 41. The planar shape of an element refers to the shape of the element in a plan view of the element. The flange portion 42 is arranged on a contact member 16 which will be described later. The flange portion 42 is formed so that an upper surface thereof makes contact with a lower surface of the cover 3 in a no-load state where no external load is applied to the pressing portion 41. The contact between the upper surface of the flange portion 42 and the lower surface of the cover 3 prevents the pressing member 4 from slipping out through the openings 23 and 33 and falling out from the input device 100. The holding portion 43 extends downward from an outer periphery of the flange portion 42, and holds the contact member 16. The holding portion 43 is formed so that an inner peripheral surface thereof makes contact with an outer peripheral surface of an upper end portion of the contact member 16. The holding of the contact member 16 by the holding portion 43 restricts a movement of the contact member 16 in an in-plane direction that is perpendicular to a vertical (up-and-down) direction in FIG. 2.

The shape of the pressing member 4 is not limited to the shape of the example described above. The pressing portion 41 may have a parallelepiped shape, for example.

The first terminal T1 has one end thereof connected to a first electrode 12 which will be described later, and the other end thereof connected to a high-voltage power supply. A voltage output from the high-voltage power supply will be referred to as a power supply voltage Vin. The second terminal T2 has one end thereof connected to a third electrode 14, and the other end thereof connected to a low-voltage power supply. The low-voltage power supply is the ground, and a voltage output from the low-voltage power supply will be referred to as a ground voltage. Each of the output terminals Tout1 and Tout2 has one end thereof connected to a second electrode 13 which will be described later, and the other end thereof connected to an external signal processing device (or signal processor, not illustrated). The other end of each of the first terminal T1, the second terminal T2, and the output terminals Tout1 and Tout2 is exposed to the outside of the housing 2. The input device 100 may require only one of the output terminals Tout1 and Tout2.

Figure 3:
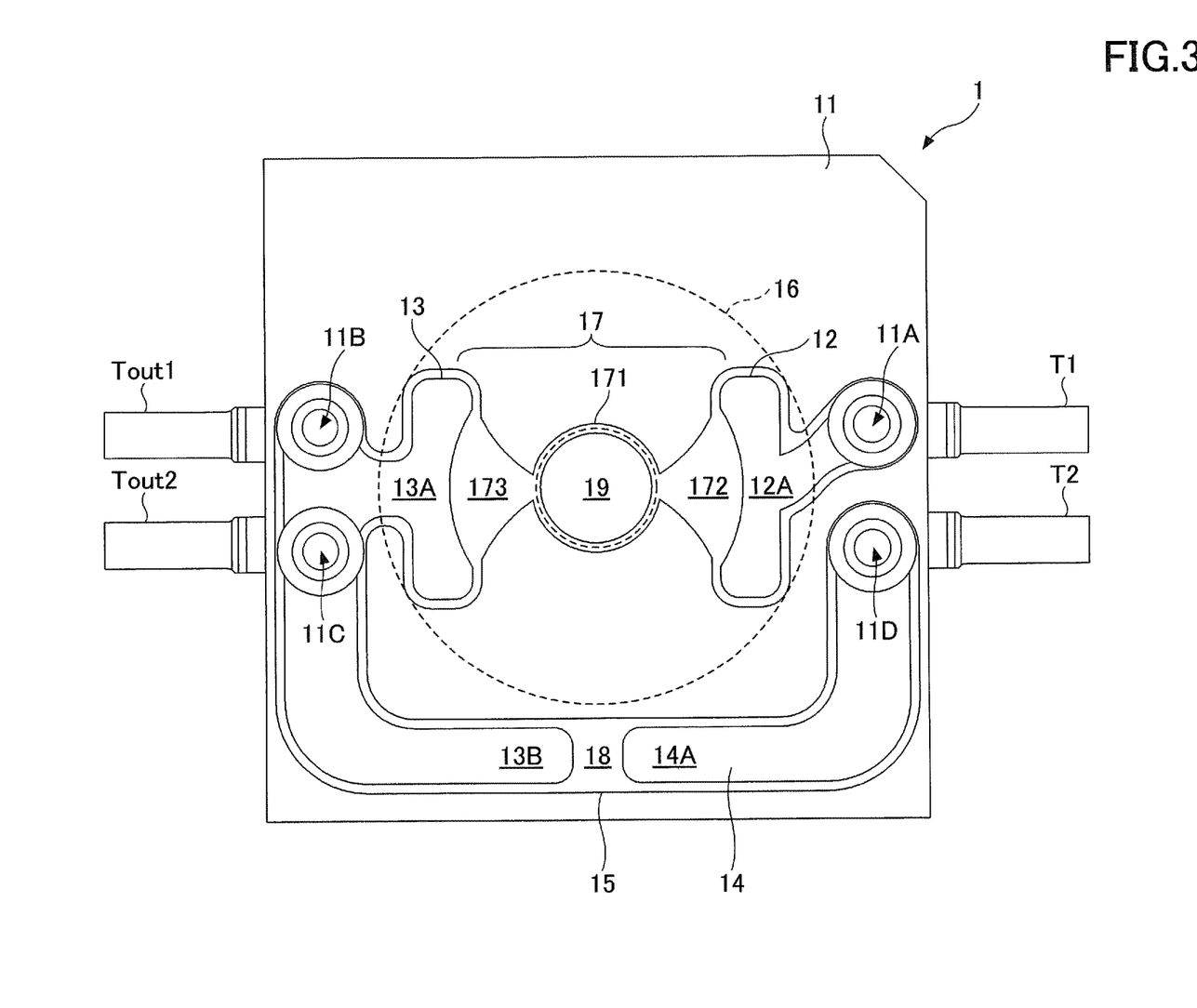
FIG. 3 is a plan view illustrating an example of the detection device.

Next, a structure of the detection device 1 will be described. FIG. 3 is a plan view illustrating an example of the detection device 1. The detection device 1 illustrated in FIG. 3 includes a substrate 11, the first electrode 12, the second electrode 13, a third electrode 14, a resistor pattern 15, and the contact member 16.

The substrate 11 is a printed circuit board that is formed by an insulating resin, and has an approximately rectangular planar shape. The substrate 11 is arranged on a bottom surface of the housing 2 (lower housing portion 22). In the example illustrated in FIG. 3, the substrate 11 is assumed to be a rigid substrate, however, the substrate 11 may be a flexible substrate. Of course, the shape of the substrate 11 is not limited to the shape of the example illustrated in FIG. 3.

The first electrode 12 is an electrode pattern formed on an upper surface of the substrate 11, and may be formed by a conductive material including metals, such as silver, copper, or the like, for example. The conductive material may be a silver paste, for example. The first electrode 12 includes a first end 12A that is formed to a wide shape so as to oppose a first end 13A of the second electrode 13, and a second end, opposite to the first end 12A, that is connected to the first terminal T1 via a through-hole 11A formed in the substrate 11. In other words, the power supply voltage Vin is applied to the first electrode 12 via the first terminal T1. Alternatively, the first electrode 12 and the first terminal T1 may be connected by forming a hole in the substrate 11 and caulking the terminal, for example.

The second electrode 13 is an electrode pattern formed on the upper surface of the substrate 11, and may be formed by a conductive material including metals, such as silver, copper, or the like, for example. The conductive material may be a silver paste, for example. The second electrode 13 includes a first end 13A that is formed to a wide shape so as to oppose the first end 12A of the first electrode 12, and a second end 13B, opposite to the first end 13A, that is formed so as to oppose a first end 14A of the third electrode 14. In addition, the second electrode 13 is connected to the output terminals Tout1 and Tout2 via through-holes 11B and 11C formed in the substrate 11, respectively. In other words, the voltage of the second electrode 13 is output via the output terminals Tout1 and Tout2 as the output voltage Vout. Alternatively, the second electrode 13 and the output terminals Tout1 and Tout2 may be connected by forming a hole in the substrate 11 and caulking the terminal, for example. In the following, when not distinguishing the output terminals Tout1 and Tout2 from each other, each of the output terminals Tout1 and Tout2 will be generally referred to as the output terminal Tout.

The third electrode 14 is an electrode pattern formed on the upper surface of the substrate 11, and may be formed by a conductive material including metals, such as silver, copper, or the like, for example. The conductive material may be a silver paste, for example. The third electrode 14 includes the first end 14A that is formed so as to oppose the second end 13B of the second electrode 13, and a second end, opposite to the first end 14A, that is connected to the second terminal T2 via a through-hole 11D formed in the substrate 11, respectively. In other words, the third electrode 14 is connected to the ground (or grounded) via the second terminal T2. Alternatively, the third electrode 14 and the second terminal T2 may be connected by forming a hole in the substrate 11 and caulking the terminal, for example.

The shape and arrangement of each of the first electrode 12, the second electrode 13, and the third electrode 14 are not limited to those of the example illustrated in FIG. 3. In addition, the through-holes 11A through 11D may be arbitrarily designed according to the shape and arrangement of each of the first electrode 12, the second electrode 13, and the third electrode 14.

The resistor pattern 15 is a pattern formed on the upper surface of the substrate 11, and is a resistor having a first resistivity. A material forming the resistor is not particularly limited, and may be a resin including carbon, for example. The first resistivity is sufficiently high compared to resistivities of the first electrode 12, the second electrode 13, and the third electrode 14. The resistor pattern 15 includes a variable resistor portion 17, and a fixed resistor portion 18.

The variable resistor portion 17 is the portion formed between the first end 12A of the first electrode 12 and the first end 13A of the second electrode 13, and electrically connects the first electrode 12 and the second electrode 13. A resistance Rv between the first electrode 12 and the second electrode 13 varies according to a contact area between the contact member 16 and the variable resistor portion 17. Details of the shape of the variable resistor portion 17 will be described later.

The fixed resistor portion 18 is the portion formed between the second end 13B of the second electrode 13 and the first end 14A of the third electrode 14, and electrically connects the second electrode 13 and the third electrode 14. Because the variable resistor portion 17 and the fixed resistor portion 18 are formed as portions of the resistor pattern 15, the variable resistor portion 17 and the fixed resistor portion 18 have the same resistivity, that is, the first resistivity. A resistance Rf between the second electrode 13 and the third electrode 14 corresponds to the resistance of the fixed resistor portion 18, and is constant.

In the example illustrated in FIG. 3, the resistor pattern 15 is formed as a string of patterns covering the first electrode 12, the second electrode 13, and the third electrode 14. In other words, the variable resistor portion 17 and the fixed resistor portion 18 are integrally formed by the resistor pattern 15. The variable resistor portion 17 and the fixed resistor portion 18 may easily be formed by forming the resistor pattern 15 in this manner. However, the shape of the resistor pattern 15 is not limited to that of the example illustrated in FIG. 3, and for example, the resistor pattern 15 forming the variable resistor portion 17, and the resistor pattern 15 forming the fixed resistor portion 18, may be formed independently of each other.

The contact member 16 is a movable contact formed by an elastic material, such as rubber or the like, and including a conductive material, such as carbon or the like. The contact member 16 has a second resistivity, and has an up-side down truncated cone shape illustrated in FIG. 2. The second resistivity is sufficiently low compared to the first resistivity, for example. The contact member 16 is arranged so that a lower surface thereof, that is, a planar surface having the smaller area in the up-side down truncated cone shape, makes contact with a predetermined contact portion 171 of the variable resistor portion 17. In addition, the pressing member 4 is arranged on an upper surface of the contact member 16, that is, a planar surface having the larger area in the up-side down truncated cone shape. The user applies the load L in the downward direction on the contact member 16 via the pressing member 4.

In the example illustrated in FIG. 3, a low-resistance portion 19, having a resistivity lower than the first resistivity, is provided on the contact portion 171 of the variable resistor portion 17. The low-resistance portion 19 is formed by a conductive material including metals, such as silver, copper, or the like, for example. The conductive material may be a silver paste, for example. The resistance Rv between the first electrode 12 and the second electrode 13 in the no-load state can be stabilized by providing the low-resistance portion 19 on the contact portion 171, and arranging the contact member 16 on the contact portion 171 (low-resistance portion 19). However, it is not essential to provide the low-resistance portion 19 on the contact portion 171.

Further, in the example illustrated in FIG. 3, the contact member 16 has the up-side down truncated cone shape, however, the shape of the contact member 16 is not particularly limited. The contact member 16 may have an arbitrary shape that causes the shape of the contact area between contact member 16 and the variable resistor portion 17 to vary correspondingly (in a similar shape) according to the load L. The shape of the contact area is not limited to a circular shape, and may be an arbitrary shape including a triangular shape, a rectangular shape, an oval shape, or the like, for example.

Moreover, in the example illustrated in FIG. 3, it is assumed that the contact member 16 is arranged to make contact with the contact portion 171 in the no-load state. However, the contact member 16 may be arranged to separate from the contact portion 171 in the no-load state. An example of a method of arranging the contact member 16 in such a manner may provide an elastic member, such as a compression coil spring or the like, between the contact member 16 and the substrate 11.

Figure 4:
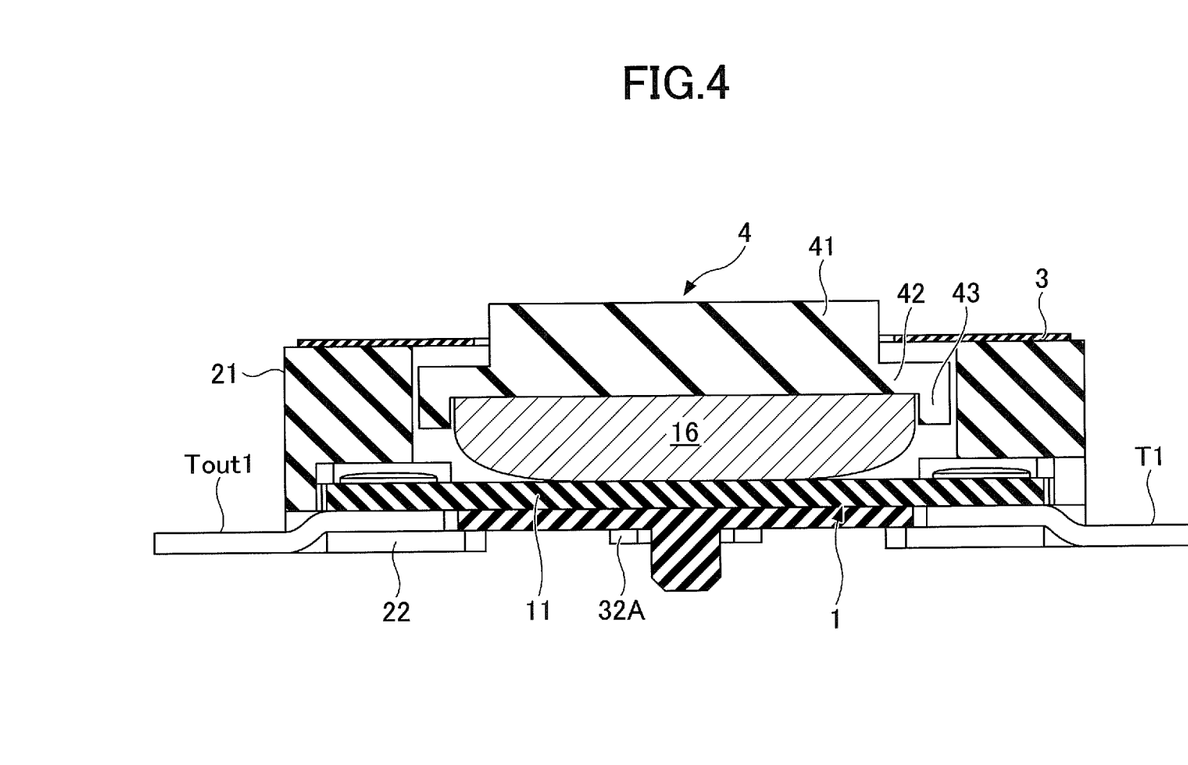
FIG. 4 is a cross sectional view of the detection device in a state where a pressing member is pressed.

Next, an operation of the input device 100 will be described. FIG. 4 is a cross sectional view of the detection device 100 in a state where the pressing member 4 is pressed. When the user presses the pressing member 4 downward, the contact member 16 is pressed downward (in the direction toward the variable resistor portion 17) by the pressing member 4 as illustrated in FIG. 4, and is elastically deformed. More particularly, the contact member 16 is elastically deformed so that the lower surface thereof is enlarged concentrically (in a similar shape). Hence, the contact area between the contact member 16 and the variable resistor portion 17 is enlarged. When the user stops pressing the pressing member 4, the contact member 16 is elastically deformed back into its original shape, thereby reducing the contact area between the contact member 16 and the variable resistor portion 17.

Accordingly, the contact area between the contact member 16 and the variable resistor portion 17 varies according to the load L that is applied to the pressing member 4 in the downward direction, and the contact area becomes larger as the load L becomes larger. In addition, because the contact member 16 has the second resistivity that is sufficiently low compared to the first resistivity of the variable resistor portion 17 as described above, the resistance Rv between the first electrode 12 and the second electrode 13 becomes smaller as the contact area between the contact member 16 and the variable resistor portion 17 becomes larger. As a result, the resistance Rv between the first electrode 12 and the second electrode 13 becomes smaller as the load L becomes larger.

Figure 5:
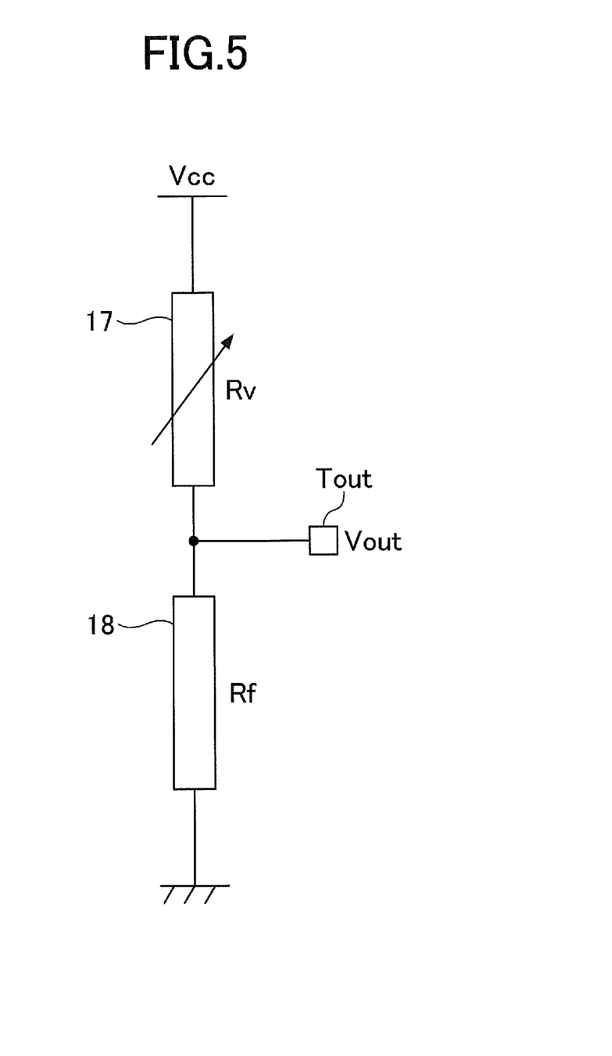
FIG. 5 is a circuit diagram schematically illustrating the detection device.
Figure 6:
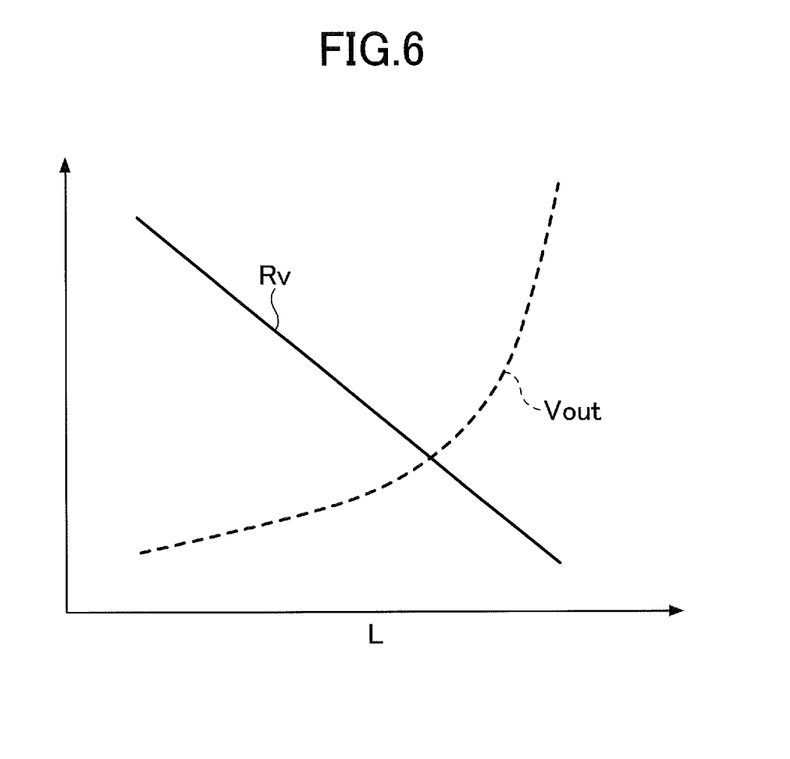
FIG. 6 is a graph illustrating a relationship of a load L, a resistance Rv, and an output voltage Vout in a conventional detection device.

FIG. 5 is a circuit diagram schematically illustrating the detection device 1. FIG. 6 is a graph illustrating a relationship of the load L, the resistance Rv, and the output voltage Vout in a conventional detection device. In FIG. 6, a solid line indicates the resistance Rv, and a dotted line indicates the output voltage Vout.

As may be seen from FIG. 5, the output voltage Vout that is output from the output terminal Tout becomes a voltage that is obtained by dividing the power supply voltage Vin by the variable resistor portion 17 and the fixed resistor portion 18. Accordingly, the following formula (1) stands.

$$Vout = Vin \times Rf/(Rv+Rf) \qquad (1)$$

Because the resistance Rv becomes smaller as the load L becomes larger, it may be seen from the formula (1) that the output voltage Vout becomes larger as the load L becomes larger.

As illustrated in FIG. 6, in the conventional detection device, the resistance Rv varies linearly with respect to the load L, and thus, from the formula (1), the output voltage Vout varies nonlinearly with respect to the load L. In other words, the conventional detection device cannot obtain the output voltage Vout that varies linearly with respect to the load L.

On the contrary, the variable resistor portion 17 is provided in the detection device 1, so that the output voltage Vout varies linearly with respect to the load L. More particularly, the output varying region is provided in the variable resistor portion 17. The output varying region is provided in at least a portion of the variable resistor portion 17, and causes the output voltage Vout to vary according to the contact area between the contact member 16 and the variable resistor portion 17. The output varying region is formed so that a contact distance D between the variable resistor portion 17 and the outer peripheral portion of the contact member 16 becomes longer as the contact area between the contact member 16 and the variable resistor portion 17 becomes larger, that is, as the load L becomes larger.

For example, in the example illustrated in FIG. 3, the variable resistor portion 17 includes the contact portion 171, and the output varying region including a first portion 172 and a second portion 173. The first portion 172 is formed between the first electrode 12 and the contact portion 171. The first portion 172 is formed so that a width thereof becomes narrower in a direction separated more from the first electrode 12, that is, the width thereof becomes wider in a direction closer to the first electrode 12. The second portion 173 is formed between the second electrode 13 and the contact portion 171. The second portion 173 is formed so that a width thereof becomes narrower in a direction separate more from the second electrode 13, that is, the width thereof becomes wider in a direction closer to the second electrode 13. When the output varying region is formed in this manner, the contact distance D between the outer peripheral portion of the contact member 16 and the output varying region (the first portion 172 and the second portion 173) becomes longer as the load L becomes larger.

In the example illustrated in FIG. 3, the circular contact portion 171 is arranged at a center between the first end 12A of the first electrode 12 and the first end 13A of the second electrode 13, and the outer peripheral portion of each of the first ends 12A and 13A on the side of the contact portion 171 has an arcuate shape that is concentric to the contact portion 171. For this reason, the output varying region is formed by the fan-shaped first portion 172 and the fan-shaped second portion 173 that oppose each other via the contact portion 171. However, the shape of the output varying region is not particularly limited. For example, the first portion 172 and the second portion 173 may have a trapezoidal shape, a bell shape, or the like. Further, the first portion 172 and the second portion 183 may have mutually different shapes and/or sizes. In a case where the contact portion 171 is arranged on the outer side between the first end 12A of the first electrode 12 and the first end 13A of the second electrode 13, the first portion 172 and the second portion 173 may be arranged to oppose each other without sandwiching the contact portion 171 therebetween. Moreover, in a case where no contact portion 171 is provided in the variable resistor portion 17, a part of the first portion 172 most distant from the first electrode 12, and a part of the second portion 173 most distant from the second electrode 13, may be connected to each other. Hence, the output varying region may have an arbitrary shape so that the contact distance D between the variable resistor portion 17 and the outer peripheral portion of the contact member 16 becomes longer as the load L becomes larger.

Figure 7A:
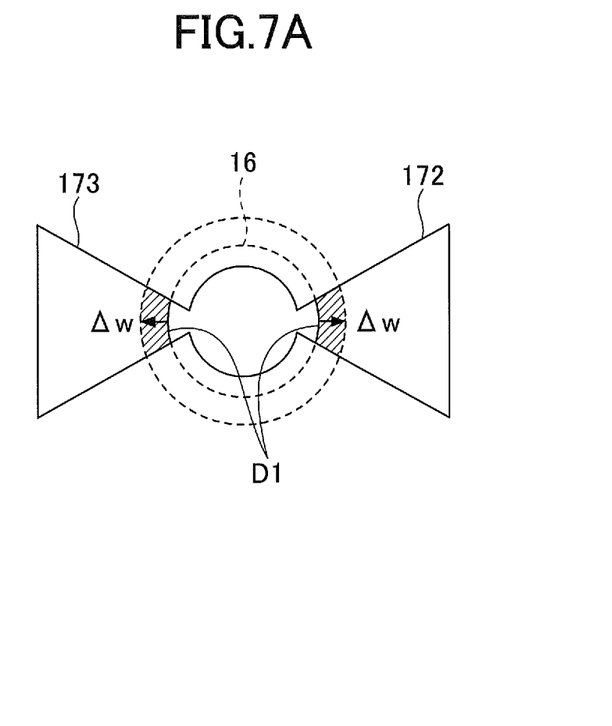
FIG. 7A is a diagram for explaining a relationship of the load L and the resistance Rv.
Figure 7B:
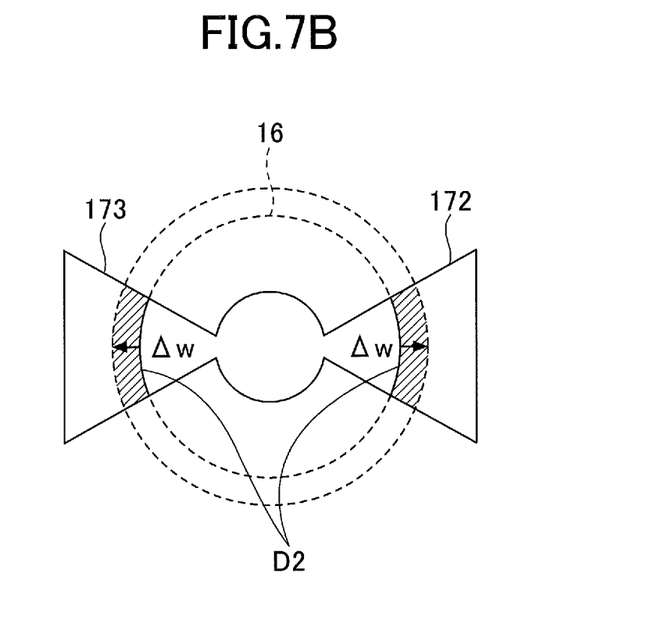
FIG. 7B is a diagram for explaining the relationship of the load L and the resistance Rv.
Figure 8:
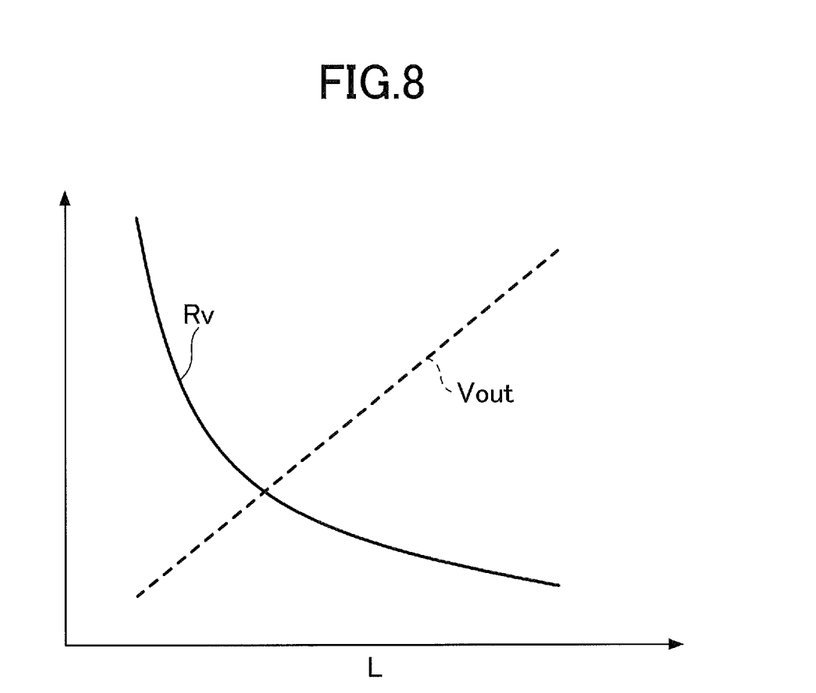
FIG. 8 is a graph illustrating the relationship of the load L, the resistance Rv, and the output voltage Vout in the detection device according to one embodiment.

Next, the relationship of the load L and the resistance Rv in this embodiment will be described. FIG. 7A and FIG. 7B are diagrams for explaining the relationship of the load L and the resistance Rv. FIG. 7A illustrates the contact member 16 and the variable resistor portion 17 for a case where the load L is L1, and FIG. 7B illustrates the contact member 16 and the variable resistor portion 17 for a case where the load L is L2 (>L1). Because a relationship L2>L1 stands, a contact distance D1 in FIG. 7A is shorter than a contact distance D2 in FIG. 7B, and D1<D2. In addition, FIG. 8 is a graph illustrating the relationship of the load L, the resistance Rv, and the output voltage Vout in the detection device 1 according to this embodiment.

When a load ΔL is further applied in a state where the load L1 is applied to the contact member 16, the contact area between the contact member 16 and the output varying region (the first portion 172 and the second portion 173) increases by an area (≈D1×Δw×2) indicated by hatchings in FIG. 7A, corresponding to an increase Δw in the width, and the resistance Rv of the variable resistor portion 17 decreases by a resistance R1 of the area indicated by the hatchings.

On the other hand, when the load ΔL is further applied in a state where the load L2 is applied to the contact member 16, the contact area between the contact member 16 and the output varying region (the first portion 172 and the second portion 173) increases by an area (≈D2×Δw×2) indicated by hatchings in FIG. 7B, corresponding to an increase Δw in the width, and the resistance Rv of the variable resistor portion 17 decreases by a resistance R2 of the area indicated by the hatchings. Because the contact member 16 has the up-side down truncated cone shape, the width Δw of the area indicated by the hatchings may be regarded as being linear with respect to the load ΔL.

Since the relationship D1<D2 stands, the resistance R1 become higher than the resistance R2. Hence, in the detection device 1 according to this embodiment, the variation in the resistance Rv becomes larger as the load L applied to the contact member 16 becomes smaller, and as illustrated in FIG. 8, the linearity of the output voltage Vout with respect to the load L can be improved.

As described heretofore, in the detection device 1 according to this embodiment, the variable resistor portion 17 includes the output varying region that is formed so that the contact distance D between the variable resistor portion 17 and the outer peripheral portion of the contact member 16 becomes longer as the load L becomes larger. For this reason, it is possible to improve the linearity of the output voltage Vout with respect to the load L.

In addition, although the linearity of the output voltage Vout in the conventional detection device can be improved by increasing the resistance Rf, a dynamic range of the output voltage Vout becomes narrow when the resistance Rf is high. Consequently, a resolution of the output voltage Vout with respect to the load L deteriorates when the resistance Rf is high.

On the contrary, in the detection device 1 according to this embodiment, it is possible to improve the linearity of the output voltage Vout with respect to the load L, without increasing the resistance Rf. For this reason, compared to the conventional detection device, the dynamic range of the output voltage Vout can be made wide, and the resolution of the output voltage Vout with respect to the load L can be improved, in the case of the detection device 1 according to this embodiment.

Therefore, according to the disclosed detection device, it is possible to improve the linearity of the output voltage of the detection device with respect to the applied load.

Although embodiments are described in detail above, the present invention is not limited to particular embodiments, and various variations, modifications, and substitutions may be made without departing from the scope of the present invention.

What is claimed is:

1. A detection device comprising:
a first electrode;
a second electrode;
a variable resistor portion formed between first electrode and the second electrode; and
a contact member that is elastically deformable and has a contact area with the variable resistor portion,
wherein the contact area increases according to a load that is applied to the contact member in a direction toward the variable resistor portion,
wherein the variable resistor portion includes an output varying region that varies an output voltage from the second electrode according to the contact area, and
wherein the output varying region is formed so that a contact distance between the variable resistor portion and an outer peripheral portion of the contact member becomes longer as the contact area becomes larger.

2. The detection device as claimed in claim 1, wherein the output varying region includes a first portion having a width that becomes narrower in a direction separated more from the first electrode.

3. The detection device as claimed in claim 2, wherein a shape of the contact area varies correspondingly according to the load.

4. The detection device as claimed in claim 2, wherein the contact member has a truncated cone shape.

5. The detection device as claimed in claim 2, wherein the output varying region includes a second portion having a width that becomes narrower in a direction separated more from the second electrode.

6. The detection device as claimed in claim 5, wherein the variable resistor portion includes a contact portion connecting the first portion and the second portion, and the contact member is arranged to make contact with the contact portion.

7. The detection device as claimed in claim 6, wherein the first portion and the second portion are arranged to oppose each other via the contact portion.

8. The detection device as claimed in claim 6, wherein the contact portion includes a low-resistance portion having a resistivity lower than resistivities of the first portion and the second portion.

9. The detection device as claimed in claim 8, wherein the low-resistance portion is formed by a silver pattern.

10. The detection device as claimed in claim 5, wherein the contact member has a resistivity lower than resistivities of the first portion and the second portion.

11. The detection device as claimed in claim 5, wherein the first portion and the second portion have the same shape.

12. The detection device as claimed in claim 5, wherein at least one of the first portion and the second portion has a shape selected from a group consisting of a fan shape, a trapezoidal shape, and a bell shape.

13. The detection device as claimed in claim 5, wherein a shape of the contact area varies correspondingly according to the load.

14. The detection device as claimed in claim 5, wherein the contact member has a truncated cone shape.

15. The detection device as claimed in claim 1, further comprising:
a third electrode; and
a fixed resistor portion formed between the second electrode and the third electrode.

16. The detection device as claimed in claim 15, wherein the variable resistor portion and the fixed resistor portion have the same resistivity.

17. The detection device as claimed in claim 1, wherein a shape of the contact area varies correspondingly according to the load.

18. The detection device as claimed in claim 1, wherein the contact member has a truncated cone shape.

* * * * *